Oct. 19, 1948.  J. H. WYMAN  2,451,898
ELECTRONIC CONTROL SYSTEM
Filed Oct. 26, 1945
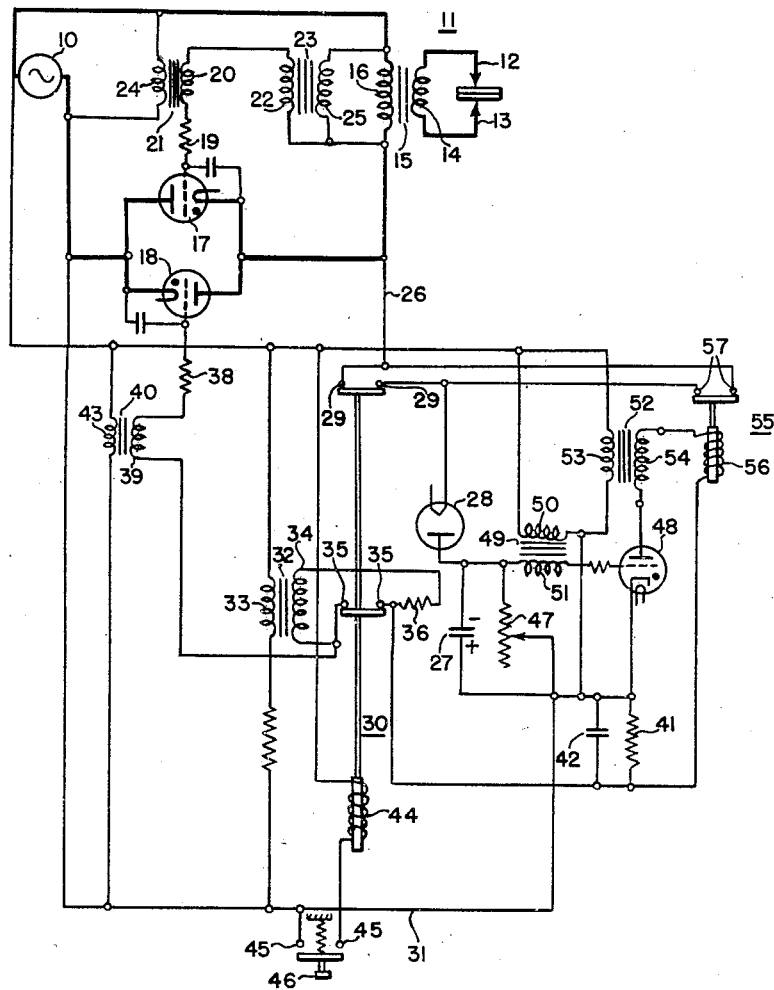
INVENTOR:
JOHN H. WYMAN,
BY Harry C. Page
ATTORNEY.

Patented Oct. 19, 1948

2,451,898

UNITED STATES PATENT OFFICE 2,451,898

ELECTRONIC CONTROL SYSTEM

John H. Wyman, Morristown, N. J., assignor to Electrical Industries, Inc., Newark, N. J., a corporation of New Jersey Application October 26, 1945, Serial No. 624,823

8 Claims. (Cl. 250—27)

The present invention relates to electrical control systems and, particularly, to such systems for controlling the translation of power from an alternating current power-supply source to a power load. While not limited thereto, the invention has particular utility in electrical resistance spot-welding systems, and will be described in that connection.

In electrical resistance spot-welding systems, it is frequently desirable to provide a control system by which to control the amount of power supplied during each spot-welding operation. Depending upon the particular type of spot weld desired, such control systems may control one or more conditions which determine the character of the weld. For example, the system may control the magnitude of a welding current or a rate of change of magnitude during each welding interval. One characteristic in common with all such control systems is that they control, during each spot-welding operation, the period during which current flows to the weld. This furnishes a primary control over the power supplied to the weld and thus determines in large part the character of the weld obtained. If the control system is to have utility in a wide range of applications involving numerous types of materials to be welded, or if it is to be easily and readily adjusted to obtain a particular character of weld in a particular material, it is usually necessary that provision be made for easily adjusting the control system accurately to obtain a desired time interval for each welding operation.

Numerous control systems have heretofore been proposed by which to provide a desired interval of current flow for each welding operation. Where accuracy of timing of the welding interval is paramount, as is usually the case, these prior control systems tend to become more and more complicated, more expensive, and less easily adjustable to select a desired time interval.

It is an object of the present invention, therefore, to provide a new and improved control system for controlling the translation of power from an alternating current power-supply source to a power load and one which avoids one or more of the disadvantages and limitations of prior such control systems.

It is an additional object of the invention to provide a new and improved control system, for controlling the translation of power from an alternating current power-supply source to a power load, of relatively simple and inexpensive construction.

It is a further object of the invention to provide a new and improved control system, for controlling the translation of power from an alternating current power-supply source to a power load, which is characterized by an unusually high degree of accuracy in effecting a desired time interval of translation of power from the source to the load.

In accordance with a particular form of the invention, a control system, for controlling the translation of power from an alternating current power-supply source to a power load, comprises a gas-discharge device having an anode and a cathode serially included between the source and the load and adapted to control the translation of power from the source to the load. The system includes an energy-storage means, a unidirectional energizing circuit responsive to the potential drop across the anode and cathode for causing energy from the source to be stored in the energy-storage means during an interval when the device permits no power to be translated from the source to the load, means for conditioning the device to permit power to be translated from the source to the load, and means for discharging energy from the energy-storage means during the interval when the device permits power to be translated from the source to the load. The control system also includes means operative upon the discharge of the energy to a predetermined value for controlling the device to terminate the translation of energy through the device from the source to the load For a better understanding of the present invention, together with other and further objects thereof reference is had to the following description taken in connection with the accompanying drawing, and its scope will be pointed out in the appended claims.

Referring now to the drawing, the single figure thereof is a circuit diagram representing a complete electrical resistance welding system which includes a control system embodying the present invention.

This control system is utilized to control the translation of power from an alternating current power-supply source 10 to a power load 11 shown as a resistance welder. The welder includes a pair of conventional welding electrodes 12, 13 which is connected to individual terminals of a secondary winding 14 of a welding transformer 15. The transformer 15 is a conventional transformer used for welding purposes and includes a primary winding 16 having one terminal connected to the alternating current source 10 and the other terminal connected to the source through a pair of oppositely poled gas-discharge devices 17, 18. The input circuit of the gas-discharge device 17 includes in series relation a current limiting resistor 19, the secondary winding 20 of a transformer 21 and the secondary winding 22 of a transformer 23. The transformer 21 has a primary winding 24 coupled across the power-supply source 10 and its secondary winding 20 develops a voltage of such magnitude and phase as normally to maintain the gas-discharge device 17 in a nonconductive state. The transformer 23 has a primary winding 25 connected across the primary winding 16 of the transformer 15 and is of such construction that the voltage developed in its secondary winding 22 has a larger magnitude than that of the secondary winding 20 of the transformer 21 and a phase such as to render the gas-discharge device 17 conductive.

The control system includes an energy-storage means, coprising a condenser 27, and a unidirectional energizing circuit responsive to the potential drop across the anode and cathode of the gas-discharge devices 17 and 18 for causing energy from the source 10 to be stored in the condenser 27 during an interval in which the gas-discharge devices permit no power to be translated from the source 10 to the load 11. In particular, this energizing circuit is coupled across the anodes and cathodes of the gas-discharge devices 17 and 18 and includes a unidirectional conductive device or rectifier 28. The unidirectional circuit may be traced from the cathode of the gas-discharge device 17 and the anode of the device 18 through a conductor 26, the normally closed contacts 29 of a relay 30, the rectifier device 28, the condenser 27, and a conductor 31 to the anode of the gas-discharge device 17 and cathode of the device 18.

The control system additionally includes means for conditioning the gas-discharge devices 17 and 18 to render them conductive and thereby permit power to be translated from the source 10 to the load 11. This means comprises a transformer 32 having a primary winding 33 energized from the power-supply source 10 and having a secondary winding 34 which develops a peaked voltage at the beginning of each cycle of the source 10. The secondary winding 34 is normally shorted through a pair of normally closed contacts 35 of the relay 30 and a current limiting resistor 36 but is arranged, upon opening of the relay contacts 35, to be included in the input or control circuit of the gas-discharge device 18. The latter circuit includes a current limiting resistor 38, the secondary winding 39 of a transformer 40, the secondary winding 34 of the transformer 32, the resistor 36, and a resistor 41 which has connected in shunt thereto a condenser 42. The transformer 40 is similar to the transformer 21, used with the gas-discharge device 17, and includes a primary winding 43 which is energized from the power-supply source 10. The voltage developed in the secondary winding 39 of the transformer 40 has such magnitude and phase as normally to maintain the gas-discharge device 18 in the nonconductive state. The conditioning means also includes the relay 30 which has an operating winding 44 connected across the power-supply source 10 through a pair of normally open contacts 45 of a manual push button 46.

There is provided in the control system means for discharging energy from the condenser 27 during the interval when the gas-discharge devices 17 and 18 are conductive and permit power to be translated from the source 10 to the load 11. This means comprises an adjustable resistor 47 connected across the condenser 27 to provide therewith a predetermined time constant which establishes the welding interval or interval of conductivity of the gas-discharge devices 17 and 18.

There is also provided means operative upon the discharge of the condenser 27 to a predetermined value for controlling the gas-discharge device 18 to terminate the translation of energy through the latter device from the source 10 to the load 11. This means includes a gas-discharge device 48, normally nonconductive, having input electrodes coupled across the condenser 27 and having an output-circuit load impedance comprising the resistor 41 and condenser 42 included, as previously mentioned, in a control circuit of the gas-discharge device 18 for rendering the latter device nonconductive during the interval when the discharge device 48 is conductive. The last-mentioned means also includes means for causing the gas-discharge device 48 to become conductive upon the discharge of the energy of the condenser 27 to the aforementioned predetermined value, this means comprising a transformer 49 having a primary winding 50 energized from the power-supply source 10 and having a secondary winding 51 serially included with the condenser 27 in the input circuit of the discharge device 48. The secondary winding 51 of the transformer 49 develops a potential of magnitude less than the fully charged potential of the condenser 27 yet of such magnitude and phase as to render the discharge device 48 conductive upon discharge of the condenser 27 to the aforementioned predetermined value.

A transformer 52 has a primary winding 53 energized from the power-supply source 10 and includes a secondary winding 54 which applies a suitable operating potential to the anode of the gas-discharge device 48. The output circuit of the latter includes means responsive to the operation of the discharge device 48, in effecting the termination of power translation from the source 10 to the load 11, for deenergizing the unidirectional energizing circuit of the condenser 27 to prevent any additional storage of energy in the condenser 27 during the operative interval of the discharge device 48. This means comprises a relay 55 having an operating winding 56 included in the output circuit of the discharge device 48 and having a pair of normally closed contacts 57 connected in parallel with the normally closed contacts 29 of the relay 30.

Considering now the operation of the control system just described, assume as an initial condition that the manually operable switch 46 is in open-circuit position so that the relay 30 is de-energized and its contacts 29 and 35 are closed. Under this assumed condition of operation, the only potential applied between the input or control electrodes of the gas-discharge device 18 is that provided by the secondary winding 39 of the transformer 40. As earlier mentioned, this potential has such magnitude and phase that it maintains the discharge device 18 in its nonconductive state. With the discharge device 18 nonconductive, no current flows from the power-supply source 10 through the primary winding 16 of the welding transformer 15 so that the transformer 23 remains de-energized. The only potential thus appearing in the input or control circuit of the gas-discharge device 17 is that of the secondary winding 20 of the transformer 21, but this potential also has such magnitude and phase as to maintain the discharge device 17 in its nonconductive state. No power is thus supplied to the welding electrodes 12 and 13. At the same time, the full potential of the power-supply source 10 appears across the anodes and cathodes of the discharge devices 17 and 18 and the condenser 27 is thus charged through the rectifier device 28 substantially to the peak potential of the power source 10. The unidirectional energizing or charging circuit for the condenser 27 includes the conductor 26, the normally closed contacts 29 of the relay 30 or the normally closed contacts 57 of the relay 55, the rectifier device 28, and the conductor 31, as previously described. The negative potential developed across the condenser 27 when the latter is fully charged is much larger than the potential developed in the secondary winding 51 of the transformer 49 and thus maintains the discharge device 48 in its nonconductive state. The relay 55 is then de-energized with its contacts 57 closed.

Assume now that the manual push button 46 is operated to close its contacts 45, thereby to energize the relay 30 which in operating opens its contacts 29 and 35. Opening of the relay contacts 29 does not interrupt the charging circuit of the condenser 27 since this circuit remains completed through the normally closed contacts 57 of the relay 55. However, opening of the contacts 35 of the relay 30 places the secondary winding 34 of the transformer 32 in the input or control circuit of the gas-discharge device 18. The peaked voltage developed in the secondary winding 34 has a magnitude larger than that developed in the secondary winding 39 of the transformer 40 and is effective to render the gas-discharge device 18 conductive. Since the peaked voltage of the secondary winding 34 of the transformer 32 occurs at the beginning of a cycle of the power-supply source 10, the gas-discharge device 18 is rendered conductive during all of the immediately subsequent first half cycle of the source 10. Current then flows from the source 10 through the primary winding 16 of the welding transformer 15 and through the gas-discharge device 18, thereby to supply welding power to the welding electrodes 12 and 13. At the same time, the potential appearing across the primary winding 16 of the welding transformer 15 energizes the transformer 23 which develops in its secondary winding 22 a voltage of such magnitude and phase as to overcome the holding voltage of the transformer 21 and cause the gas-discharge device 17 to become conductive during the succeeding half cycle of the source 10. The gas-discharge devices 17 and 18 thus alternately conduct successive half cycles of the source 10 until such time as the gas-discharge device 18 is rendered nonconductive by the control system in a manner now to be described.

As soon as the gas-discharge devices 17 and 18 become conductive as described, the potential drop across their anodes and cathodes drops to a very low value, for example of the order of twelve volts, as is well known. Thus while the charging circuit of the condenser 27 is maintained through the normally closed contacts 57 of the relay 55 even after the contacts 29 of the relay 30 have opened, the potential drop across the condenser 27 due to its charge is much larger than that occurring across the anodes and cathodes of the gas-discharge devices 17 and 18 so that the condenser no longer receives any additional charge and begins to discharge through the resistor 47. The rapidity with which the condenser 27 discharges is dependent, of course, upon the adjusted value of the resistor 47. When the energy of the condenser 27 has discharged to a predetermined value at which the potential across the condenser has a value less than that of the potential developed in the secondary winding 51 of the transformer 49, the latter potential causes the discharge device 48 to become conductive. The space current of the discharge device 48 flows through the cathode resistor 41 to develop thereacross a potential of magnitude larger than the peaking potential developed in the secondary winding 34 of the transformer 32. The potential developed across the resistor 41 appears, as previously described, in the input or control circuit of gas-discharge device 18 so that the latter is thereupon rendered nonconductive. This removes the energization from the transformer 23 and causes the gas-discharge device 17 also to be rendered nonconductive at the end of the half cycle following the last half cycle during which the discharge device 18 was conductive. The translation of energy from the power source 10 through the discharge devices 17 and 18 to the load 11 is thus terminated.

As soon as the gas-discharge device 48 is rendered conductive, the relay 55 is energized to open its contacts 57. Assuming that the push button 46 remains closed to maintain the relay 30 energized, the opening of the contacts 57 of the relay 55 interrupts the charging circuit of the condenser 27. Thus, while the full voltage of the power-supply source 10 again appears across the anodes and cathodes of the gas-discharge devices 17 and 18 upon the latter becoming nonconductive, the condenser 27 is not again recharged. This is because the continued energization of the relay 30 maintains its contacts 29 open and the gas-discharge tube 48 remains conductive to maintain the relay 55 energized with its contacts 57 open. The relay 55 is a fast-operating one, its operation being sufficiently rapid that little or no charge is received by the condenser 27 after the devices 17 and 18 are rendered nonconductive and before the relay contacts 57 open. A complete welding operation is thus completed and the gas-discharging devices 17 and 18 thereafter remain in their nonconductive state until the control system is reset to condition the system for a subsequent welding operation. Resetting of the system is accomplished by opening the push button 46 to de-energize the relay 30. The latter thereupon closes its contacts 29 and 35 to remove from the input or control circuit of the gas-discharge device 18 and the peaked voltage of the transformer 32 and to complete the unidirectional energizing or charging circuit of the condenser 27. The condenser 27 quickly recharges again to the voltage of the power-supply source 10 and, upon being recharged, causes the discharge device 48 to become nonconductive. This removes the potential developed across the resistor 41 and causes the relay 55 to become de-energized to close its contacts 57. The control system is thereupon reset and ready to start a subsequent cycle of the welding operation described.

It will be apparent from the foregoing description of the system operation that the number of complete cycles of the power source 10, during which the discharge devices 17 and 18 are conductive, is dependent upon the time required for the condenser 27 to discharge through the resistor 47 to a predetermined value at which the discharge device 48 becomes conductive. This time interval may be controlled by adjustment of the value of the resistor 47 and may be readily established at any desired value from one complete cycle to a hundred or more complete cycles.

From the foregoing description of the invention, it will be apparent that the relay 30 comprises means operative subsequently to the termination of energy translation from the source 10 through the discharge devices 17 and 18 to the power load 11 for de-energizing the conditioning means comprising the transformer 32, namely by closure of the relay contacts 35, and for effecting the restoration of the energy storage in the condenser 27, namely by completion of the charging circuit upon closure of its contacts 29, to condition the control system for another cycle of control operation.

While not limited thereto but simply illustrative as a specific embodiment of the invention, the following circuit constants are given for an embodiment of the invention of the type shown in the single figure of the drawing:

| | |
|---|---|
| Discharge devices 17 and 18 | Type C6J |
| Discharge device 43 | Type 2050 |
| Rectifier 28 | Type 80 |
| Transformers 21 and 40, secondary potential | 10 volts |
| Transformer 23, secondary potential | 50 volts |
| Transformer 32, secondary peaked potential (R. M. S.) | 24 votes |
| Transformer 49, secondary potential | 10 volts |
| Resistors 19 and 38 | 1000 ohms |
| Resistor 36 | 1000 ohms |
| Resistor 41 | 2500 ohms |
| Resistor 47: | |
|   Maximum | 280,000 ohms |
|   Minimum | 10,000 ohms |
| Condenser 27 | 0.5 microfarads |
| Condenser 42 | 2.0 microfarads |
| Relay 55, rapidity of operation | 1/60 second |
| Potential of source 10 | 220 volts |
| Number of complete cycles of conductivity of discharge devices 17 and 18 for minimum and maximum values of resistor 47: | |
|   Minimum | 1 cycle |
|   Maximum | 28 cycles |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control system for controlling the translation of power from an alternating current power-supply sources to a power load comprising, a gas-discharge device having an anode and a cathode serially included between said source and said load and adapted to control the translation of power from said source to said load, energy-storage means, a unidirectional energizing circuit responsive to the potential drop across said anode and cathode for causing energy from said source to be stored in said energy-storage means during an interval when said device permits no power to be translated from said source to said load, means for conditioning said device to permit power to be translated from said source to said load, means for discharging energy from said energy-storage means during the interval when said device permits power to be translated from said source to said load, and means operative upon the discharge of said energy to a predetermined value for controlling said device to terminate the translation of energy through said device from said source to said load.

2. A control system for controlling the translation of power from an alternating-current power-supply source to a power load comprising, a gas-discharge device having an anode and a cathode serially included between said source and said load and adapted to control the translation of power from said source to said load, energy-storage means, an energizing circuit coupled across said anode and cathode and including a unidirectional conductive device for storing energy from said source in said energy-storage means during an interval when said first-mentioned device permits no power to be translated from said source to said load, means for conditioning said first device to permit power to be translated from said source to said load, means for discharging energy from said energy-storage means during the interval when said first device permits power to be translated from said source to said load, and means operative upon the discharge of said energy to a predetermined value for controlling said first device to terminate the translation of energy through said first device from said source to said load.

3. A control system for controlling the translation of power from an alternating-current power-supply source to a power load comprising, a gas-discharge device having an anode and a cathode serially included between said source and said load and adapted to control the translation of power from said source to said load, a condenser, a unidirectional energizing circuit responsive to the potential drop across said anode and cathode for causing energy from said source to be stored in said condenser during an interval when said device permits no power to be translated from said source to said load, means for conditioning said device to permit power to be translated from said source to said load, means providing with said condenser a predetermined time constant for discharging energy from said condenser during the interval when said device permits power to be translated from said source to said load, and means operative upon the discharge of said energy to a predetermined value for controlling said device to terminate the translation of energy through said device from said source to said load.

4. A control system for controlling the translation of power from an alternating current power-supply source to a power load comprising, a gas-discharge device having an anode and a cathode serially included between said source and said load and adapted to control the translation of power from said source to said load, a condenser, a unidirectional energizing circuit responsive to the potential drop across said anode and cathode for causing energy from said source to be stored in said condenser during interval when said device permits no power to be translated from said source to said load, means for conditioning said device to permit power to be translated from said source to said load, an adjustable resistor coupled across said condenser for discharging energy from said condenser during the interval when said device permits power to be translated from said source to said load, and means operative upon the discharge of said energy to a predetermined value for controlling said device to terminate the translation of energy through said device from said source to said load.

5. A control system for controlling the translation of power from an alternating current power-supply source to a power load comprising, a gas-discharge device having an anode and a cathode serially included between said source and said load and adapted to control the translation of power from said source to said load, energy-storage means, a unidirectional energizing circuit responsive to the potential drop across said anode and cathode for causing energy from said source to be stored in said energy-storage means during an interval when said device permits no power to be translated from said source to said load, means for conditioning said device to permit power to be translated from said source to said load, means for discharging energy from said energy-storage means during the interval when said device permits power to be translated from said source to said load, means operative upon the discharge of said energy to a predetermined value for controlling said device to terminate the translation of energy through said device from said source to said load, and means responsive to the operation of said last-mentioned means in effecting said termination of power translation for de-energizing said unidirectional energizing circuit to prevent during the operative interval of said last-mentioned means any additional storage of energy in said energy-storage means.

6. A control system for controlling the translation of power from an alternating current power-supply source to a power load comprising, a gas-discharge device having an anode and a cathode serially included between said source and said load and adapted to control the translation of power from said source to said load, energy-storage means, a unidirectional energizing circuit responsive to the potential drop across said anode and cathode for causing energy from said source to be stored in said energy-storage means during an interval when said device permits no power to be translated from said source to said load, means for conditioning said device to permit power to be translated from said source to said load, means for discharging energy from said energy-storage means during the interval when said device permits power to be translated from said source to said load, and means including a second gas-discharge device having input electrodes coupled across said energy-storage means and operative upon the discharge of said energy to a predetermined value for controlling said first-mentioned device to terminate the translation of energy through said first-mentioned device from said source to said load.

7. A control system for controlling the translation of power from an alternating current power-supply source to a power load comprising, a first gas-discharge device having an anode and a cathode serially included between said source and said load and adapted to translate power from said source to said load during an interval when said device is conductive, energy-storage means, a unidirectional energizing circuit responsive to the potential drop across said anode and cathode for causing energy from said source to be stored in said energy-storage means during an interval when said device permits no power to be translated from said source to said load, means for rendering said device conductive to permit power to be translated from said source to said load, means for discharging energy from said energy-storage means during the interval when said device permits power to be translated from said source to said load, a second gas-discharge device normally nonconductive and having an output circuit load impedance included in a control circuit of said first device for rendering said first device nonconductive during the interval when said second device is conductive, and means for causing said second device to become conductive upon the discharge of said energy to a predetermined value to render said first device nonconductive and terminate the translation of energy through said first device from said source to said load.

8. A control system for controlling the translation of power from an alternating current power-supply source to a power load comprising, a gas-discharge device having an anode and a cathode serially included between said source and said load and adapted to control the translation of power from said source to said load, energy-storage means, a unidirectional energizing circuit responsive to the potential drop across said anode and cathode for causing energy from said source to be stored in said energy-storage means during an interval when said device permits no power to be translated from said source to said load, means for conditioning said device to permit power to be translated from said source to said load, means for discharging energy from said energy-storage means during the interval when said device permits power to be translated from said source to said load, means operative upon the discharge of said energy to a predetermined value for controlling said device to terminate the translation of energy through said device from said source to said load, and means operative subsequently to said termination of energy translation for de-energizing said conditioning means and for effecting the restoration of the energy storage in said energy-storage means to condition said control system for another cycle of control operation.

JOHN H. WYMAN.

REFERENCES CITED

The following references are of record in the file of this patent:

UNITED STATES PATENTS

| Number | Name | Date |
| --- | --- | --- |
| 2,389,351 | Faulk | Nov. 20, 1945 |